(12) United States Patent
Benson et al.

(10) Patent No.: US 8,990,590 B2
(45) Date of Patent: *Mar. 24, 2015

(54) SYSTEM AND METHOD FOR REMOTELY REGULATING THE POWER CONSUMPTION OF AN ELECTRIC APPLIANCE

(75) Inventors: Gregory P. Benson, Rancho Santa Fe, CA (US); Daniel Wade, El Cajon, CA (US)

(73) Assignee: Glenbrook Associates, Inc., Del Mar, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 12/608,839

(22) Filed: Oct. 29, 2009

(65) Prior Publication Data

US 2010/0114396 A1   May 6, 2010

Related U.S. Application Data

(63) Continuation of application No. 11/702,949, filed on Feb. 6, 2007, now Pat. No. 7,627,401.

(60) Provisional application No. 60/771,072, filed on Feb. 7, 2006.

(51) Int. Cl.
*G06F 1/26* (2006.01)
*H02J 3/14* (2006.01)
*H02J 13/00* (2006.01)

(52) U.S. Cl.
CPC ............... *H02J 3/14* (2013.01); *H02J 13/0062* (2013.01); *H02J 13/0079* (2013.01); *Y02B 70/3225* (2013.01); *Y02B 90/2638* (2013.01); *Y04S 20/222* (2013.01); *Y04S 40/124* (2013.01); *Y02B 70/3266* (2013.01); *Y04S 20/242* (2013.01)
USPC ........................... 713/300; 713/310; 700/295

(58) Field of Classification Search
USPC ........ 713/300; 726/12, 21; 700/286, 295, 297
See application file for complete search history.

(56) References Cited

U.S. PATENT DOCUMENTS

| | | | | |
|---|---|---|---|---|
| 5,045,774 | A | * 9/1991 | Bromberg | ...................... 323/322 |
| 5,436,510 | A | 7/1995 | Gilbert | |
| 5,572,438 | A | * 11/1996 | Ehlers et al. | .................. 700/295 |
| 6,122,603 | A | 9/2000 | Budike, Jr. | |
| 6,167,389 | A | 12/2000 | Davis et al. | |
| 6,510,369 | B1 | 1/2003 | Lacy | |
| 6,624,532 | B1 | 9/2003 | Davidow et al. | |
| 6,636,893 | B1 * | 10/2003 | Fong | .............................. 709/223 |
| 6,772,052 | B1 | 8/2004 | Amundsen et al. | |

(Continued)

FOREIGN PATENT DOCUMENTS

WO      WO 98/30912      7/1998

OTHER PUBLICATIONS

International Search Report and Written Opinion of the ISA for PCT/US2007/003266 dated Jul. 24, 2007.

(Continued)

*Primary Examiner* — Linglan Edwards
(74) *Attorney, Agent, or Firm* — Knobbe Martens Olson and Bear LLP (57) ABSTRACT

A system and method for remotely regulating the power consumption of a device are provided. The method comprises sending a message from a remote location and over a wide area data network to a controller locally attached to a device. The method further comprises adjusting, at the controller, the power supplied to the device based on the message.

33 Claims, 7 Drawing Sheets

(56) References Cited

U.S. PATENT DOCUMENTS

| | | | |
|---|---|---|---|
| 6,832,135 B2* | 12/2004 | Ying | 700/295 |
| 6,861,956 B2 | 3/2005 | Ying | |
| 6,862,498 B2 | 3/2005 | Davis et al. | |
| 7,072,945 B1* | 7/2006 | Nieminen et al. | 709/217 |
| 7,099,934 B1* | 8/2006 | Ewing et al. | 709/223 |
| 7,155,622 B2* | 12/2006 | Mancey et al. | 713/324 |
| 7,203,849 B2* | 4/2007 | Dove | 713/300 |
| 7,324,876 B2 | 1/2008 | Ying | |
| 7,890,776 B2* | 2/2011 | Diab et al. | 713/300 |
| 2002/0013689 A1* | 1/2002 | Hunton | 703/18 |
| 2002/0103655 A1 | 8/2002 | Boies et al. | |
| 2002/0138176 A1 | 9/2002 | Davis et al. | |
| 2003/0050738 A1* | 3/2003 | Masticola et al. | 700/291 |
| 2003/0126253 A1 | 7/2003 | Ewing et al. | |
| 2005/0055137 A1* | 3/2005 | Andren et al. | 700/291 |
| 2006/0065510 A1 | 3/2006 | Kiko et al. | |
| 2006/0259199 A1* | 11/2006 | Gjerde et al. | 700/284 |
| 2006/0276938 A1* | 12/2006 | Miller | 700/295 |
| 2007/0030613 A1* | 2/2007 | Sousa et al. | 361/92 |
| 2007/0038414 A1 | 2/2007 | Rasmussen et al. | |

OTHER PUBLICATIONS

International Preliminary Report on Patentability for PCT/US2007/003266 dated May 15, 2008.

* cited by examiner

ELECTRICITY CONSUMPTION REPORT

ACME INC.

HEADQUARTERS    OFFICE    Kw HRS

| | J | F | M | A | M | J | J | A | S | O | N | D | YTD | LAST YR |
|---|---|---|---|---|---|---|---|---|---|---|---|---|---|---|
| KITCHEN | 5 | 5 | 4 | 4 | 4 | 3 | 3 | 2 | | | | | 27 | 22 |
| SHIPPING | 2 | 2 | 3 | 3 | 4 | 3 | 3 | 3 | | | | | 33 | 30 |
| HVAC | 7 | 7 | 7 | 7 | 8 | 10 | 10 | 10 | | | | | 89 | 89 |

FACTORY

| | J | F | M | A | M | J | J | A | S | O | N | D | YTD | LAST YR |
|---|---|---|---|---|---|---|---|---|---|---|---|---|---|---|
| FURNACE | 40 | 41 | 45 | 42 | 50 | 50 | 55 | 70 | | | | | | |
| TOOLS | 10 | 10 | 10 | 10 | 11 | 11 | 12 | 12 | | | | | | |
| LIGHTS | 5 | 5 | 4 | 4 | 4 | 3 | 3 | 3 | | | | | | |

FIG. 8

SYSTEM AND METHOD FOR REMOTELY REGULATING THE POWER CONSUMPTION OF AN ELECTRIC APPLIANCE

CROSS-REFERENCE TO RELATED APPLICATIONS

This application is a continuation of U.S. patent application Ser. No. 11/702,949 filed on Feb. 6, 2007 entitled "SYSTEM AND METHOD FOR REMOTELY REGULATING THE POWER CONSUMPTION OF AN ELECTRIC APPLIANCE", which claims priority under 35 U.S.C. Section 119(e) to U.S. provisional patent application No. 60/771,072 filed on Feb. 7, 2006 entitled "SYSTEM AND METHOD FOR REMOTELY REGULATING THE POWER CONSUMPTION OF AN ELECTRIC APPLIANCE." Each of the above applications is incorporated in its entirety herein by reference.

BACKGROUND OF THE INVENTION

1. Field of the Invention

The invention relates generally to a system and method for remotely regulating power consumption.

2. Description of the Related Technology

A power outage may be referred to as a blackout if power is lost completely, or as a brownout if the voltage level is below the normal minimum level specified for the system, or sometimes referred to as a short circuit when the loss of power occurs over a short time (e.g. seconds). The power outage may happen, for example, when the electrical load (demand) in power supply networks exceeds the power generation for an extended period. A good solution to this challenge may be a system and method for remotely regulating the power consumption of electric appliances.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

In one aspect, there is a method of remotely regulating the power consumption of a line powered device. The method comprises sending a message from a remote location and over a wide area data network to a controller locally attached to a device. The method further comprises adjusting, at the controller, the power supplied to the device based on the message.

In another aspect, there is a system for remotely regulating the power consumption of a device. The system comprises a device. The system further comprises a first controller locally attached to the device and configured to adjust the power supply of the device based on a message received from a second controller, the second controller being remote from the device.

In another aspect, there is a system for remotely regulating the power consumption of a device. The system comprises means for sending a message from a remote location and over a wide area data network to a controller locally attached to a device. The system further comprises means for adjusting, at the controller, the power supplied to the device based on the message.

DETAILED DESCRIPTION OF CERTAIN INVENTIVE EMBODIMENTS

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
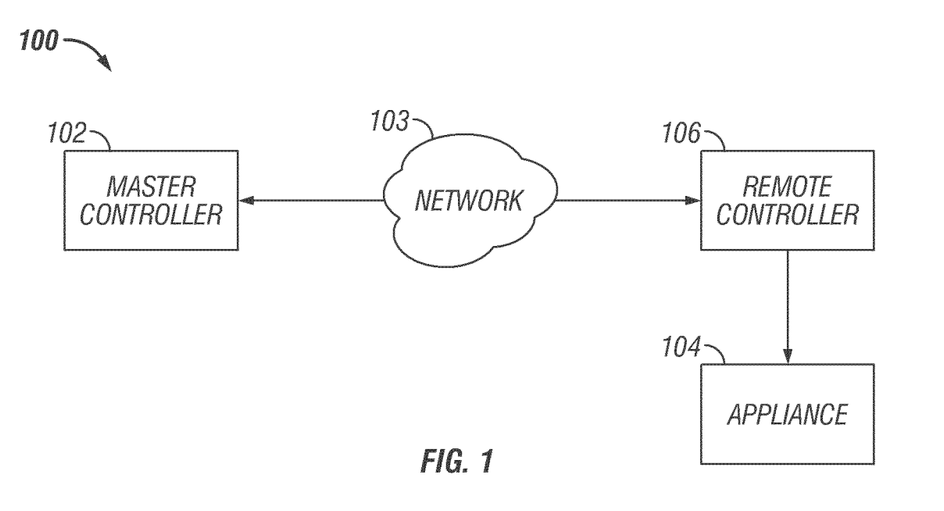
FIG. 1 is a block diagram illustrating one exemplary embodiment of a system for remotely controlling the power consumption of a device.

FIG. 1 is a block diagram illustrating one exemplary embodiment of a system for remotely controlling the power consumption of a device. Depending on the embodiment, certain modules may be removed or merged together. The device may be of any type that uses electricity obtained from a main power source such as standard AC current obtained from a utility power grid.

The system 100 may comprise a remote controller 106 located between a power outlet (not shown) and an appliance 104. The remote controller 106 is configured to adjust the power supply from the outlet to the appliance 104 based on instructions received from a master controller 102. In one embodiment, the remote controller 106 is a unit separate from and externally connected to the appliance 104. In another embodiment, the remote controller 106 may be integrated within the appliance 104.

In one embodiment, the remote controller 106 may comprise an electric valve/switch. The valve/switch may be: built into the device, built into the utility receptacle, or provided as an external add-on.

The master controller 102 may be connected to the remote controller 106 by various communication links such as wireless, cable, phone lines, or Power Line Carrier. In one embodiment, the master controller 102 is connected to the remote controller 106 via a network 103 which may be of any suitable type. Both the master controller 102 and the remote controller 106 are equipped to communicate to each other.

The master controller 102 is configured to monitor the demand of the power network and send instructions to the remote controller 106 to adjust the power supply to the appliance 104, if necessary. The power controller 102 may be, for example, located at the power vendor (power provider)'s side. The instruction may be, for example, in the form of a message. The adjustment may vary depending on the specific application. In one embodiment, the adjustment is to switch on or off the power supply to the appliance 104. In another embodiment, the adjustment may be a graduated restriction in which the appliance is supplied with power on less than a full scale.

A control device such as the master controller 102 and the remote controller 106 may be implemented in any suitable software or hardware. In one embodiment, a control device may be any suitable general purpose single- or multi-chip microprocessor, or any suitable special purpose microprocessor such as a digital signal processor, microcontroller, or a programmable gate array.

The control device may further comprise a memory for data storage. The control device may comprise a communication device for communicating to other devices. The control device may comprise a power supply and/or a backup power supply, such as battery. The control device may comprise a user interface to alert the user. For example, the user interface may be a display, a light, or a sound producing device.

In one embodiment, the master controller 102 is connected to multiple appliances 104 via remote controllers 106. The master controller 102 monitors the demand of the power network and sends instructions to one or more selected remote controllers to request compliance with a certain policy of power consumption.

The system illustrated in FIG. 1 may be used to implement various schemes to regulate the demand of a power network including multiple appliances. In one exemplary embodiment to be described below, the power vendor regulates the power consumption based on a priority scale. As a result, intermittent peak demand surges can be minimized thus avoiding or delaying the need for new generation capacity.

According to the scheme, each customer is assigned a priority code based upon the importance of its operations. In addition, devices may be further categorized by type or function. For example, devices or the sector in which it is used might have different priority codes depending on the associate operation, as illustrated below:

10—critical infrastructure (power, communications, airports, etc.)
    9—military
    8—emergency services
    7—hospitals
    3—private residences
    1—public parks In one embodiment, each device has a remotely accessible configuration profile stored at the device. The remote controller may easily read the profile stored at the device. The profile may be stored in, for example, an on-board memory, and comprise at least one of the following:

Unique ID
    Device type
    Security requirements/protocol
    Device operating specifications
    Operating modes available
    Optional services that may be remotely controlled
    Fixed or modifiable priority code During peak load periods, a power vendor would request a temporary shut down of all appliances with the lowest priority. The master controller 102 broadcasts an instruction requesting shut down of all priority level 1 locations with device type X to the remote controller 106 attached to each appliance 104. Upon receiving the message, the remote controller 106 shuts down the power of the corresponding appliance 104 until a start message is received. If consumption is still high, the power vendor can progressively shut down customer types or appliances with higher priorities until consumption is under control. When load levels drop, progressive re-boot of appliances of each priority level can be enabled as needed.

For example, in a low threat situation, a power vendor may, by the master controller 106, request that all devices in Category X (e.g., household laundry devices) turn off for a given time period. In a high threat situation, a power vendor may request that all devices except Category A (e.g., life support equipment) be shut down until further notice.

Figure 2:
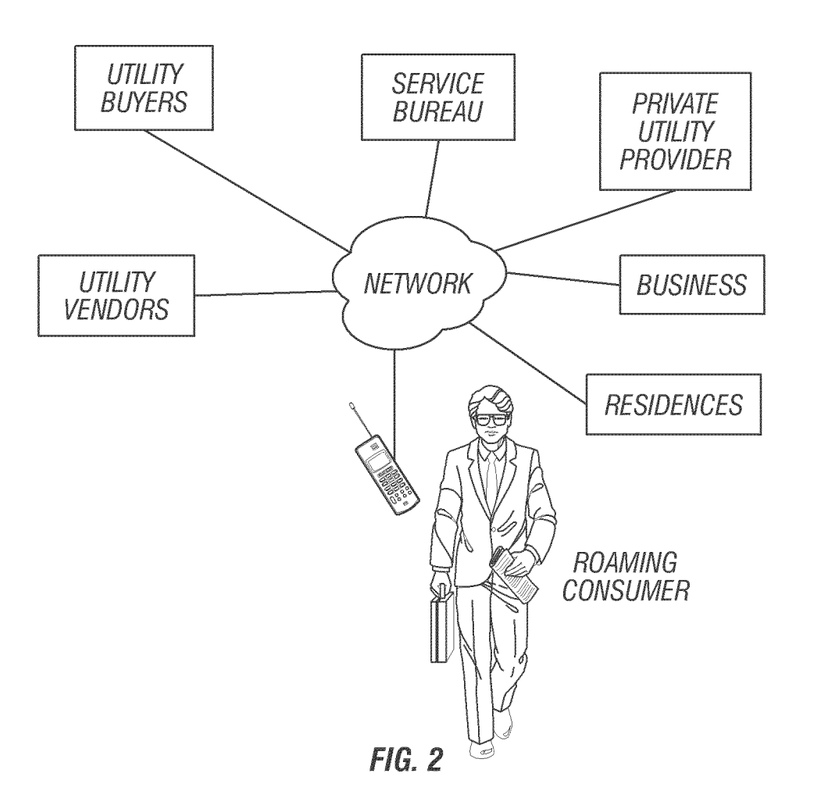
FIG. 2 is a block diagram illustrating an exemplary network connecting both the power vendors and the power consumers.

FIG. 2 illustrates an example of a network connecting both the power vendors and the power consumers. As illustrated, the network may include one or more of the following: utility buyers, utility vendors, service bureaus, private utility providers, businesses, residences, and roaming users.

Figure 3:
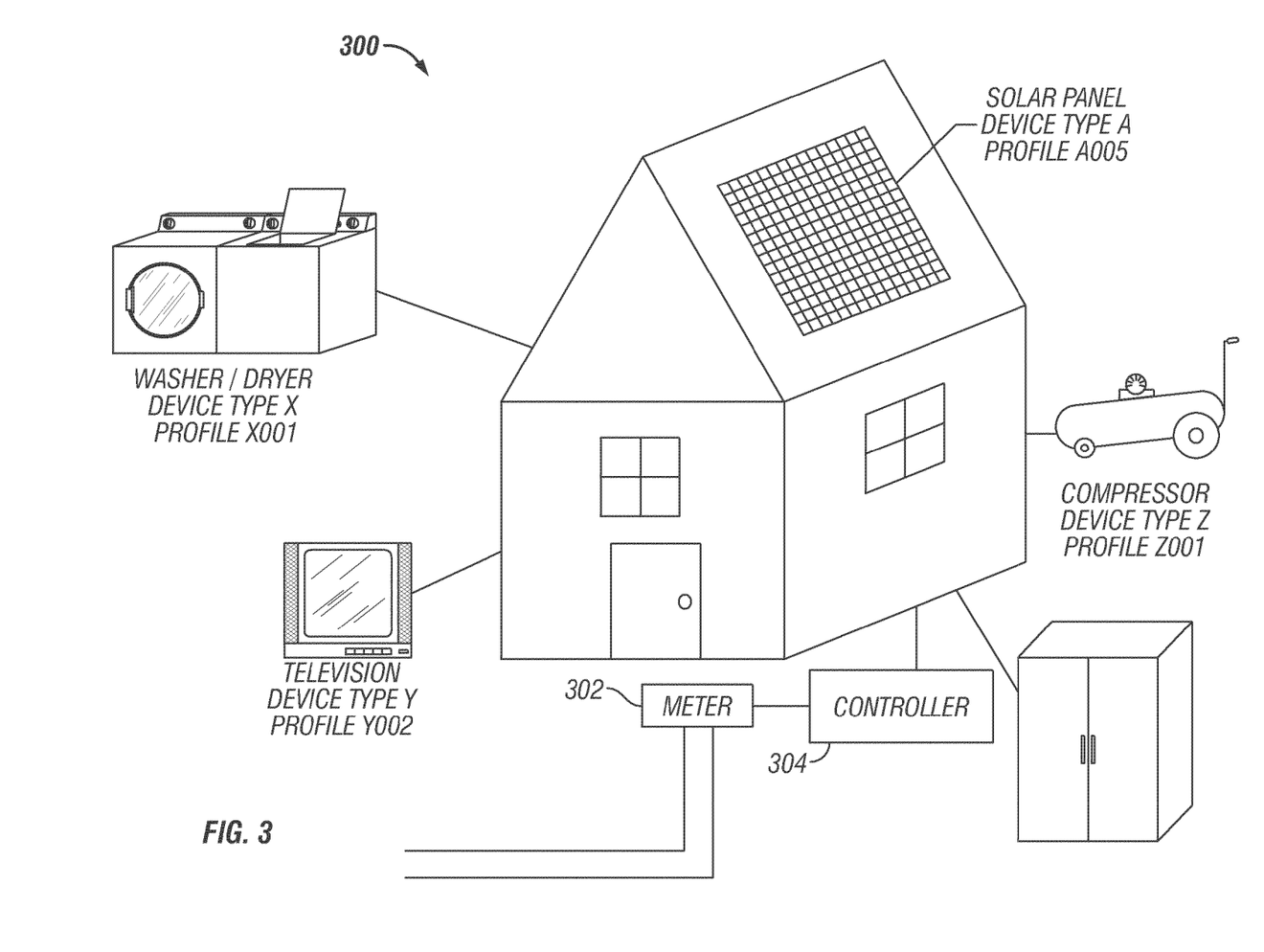
FIG. 3 is a diagram illustrating an exemplary residence including various devices using electricity.

FIG. 3 illustrates an example of a residence 300 including various devices using electricity. As illustrated, the residence 300 may have one or more of the following devices: a washer/dryer, a television set, an air conditioner, and a solar panel device. Each device may have a profile stored therein or on a remote server. The profile may comprise, for example, the type of the corresponding device which may affect the priority of the device. A meter 302 may be connected to the outside power line and configured to count the power usage of the residence. The residence may further have a controller 304 located between the meter and all the other devices of the residence to control the total electricity usage within the residence. In some cases, a network user may also operate one or more power generation devices such as the solar panel indicated in FIG. 3. The local controller would then monitor the amount of energy produced and report the data periodically to the master controller for purposes of crediting the customer.

Figure 4:
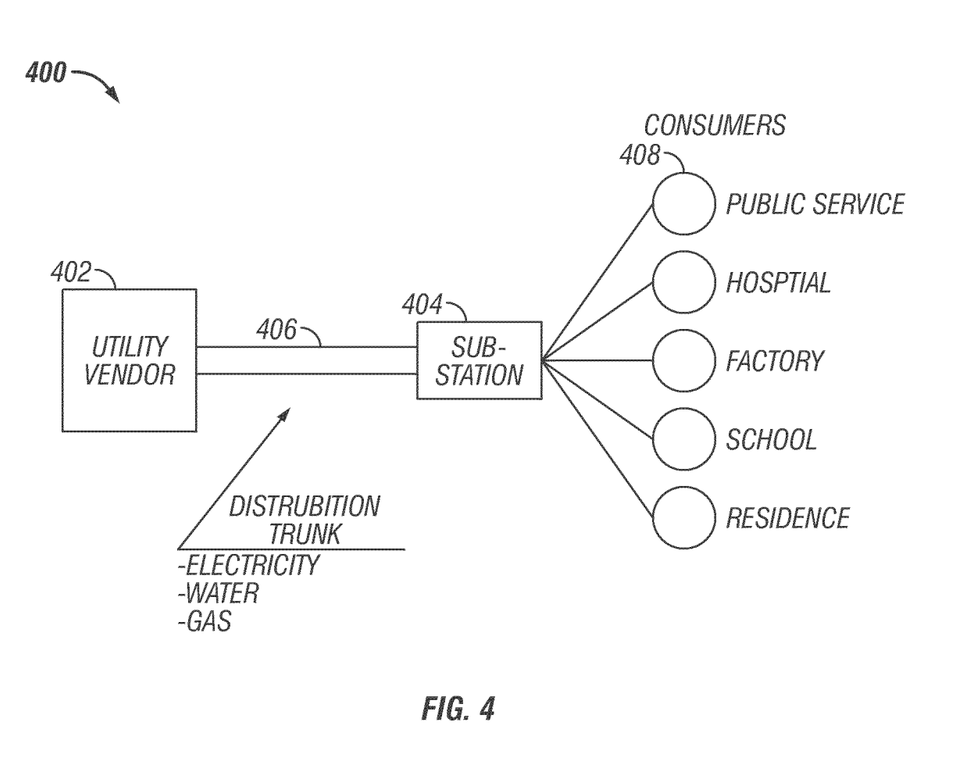
FIG. 4 is a block diagram illustrating an exemplary system comprising a utility vendor and various users.

FIG. 4 illustrates an example of a system comprising a utility vendor and various users. The system includes a utility vendor 402 delivering utility to a substation 404 via a link 406. The utility may be electricity, water, or gas. The link 406 is of the type suitable for delivering the corresponding utility. The substation 404 may be further connected to one or more end users or power consumers 408. The end user 408 may be, for example, a public service entity, a hospital, a factory, a school, or a residence.

Figure 5:
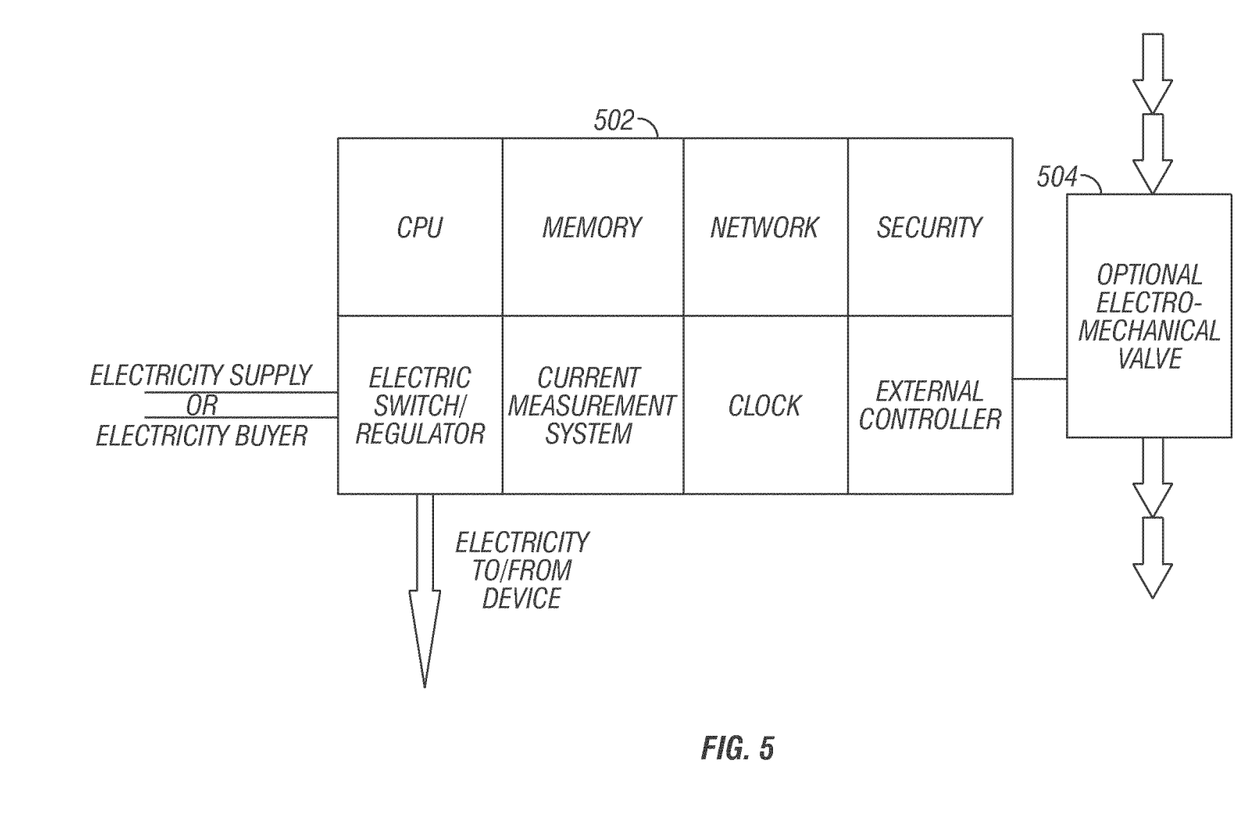
FIG. 5 is a diagram illustrating an example of a control device.

FIG. 5 illustrates an example of a control device. The control device 502 may be used as the master controller or the remote controller (see FIG. 1). The control device 502 may communicate with the electricity vendor, the buyers, and the electricity device, depending on the role it plays. The control device 502 may be used together with an optional electromechanical valve 504 to adjust the power supply for an appliance.

Figure 6:
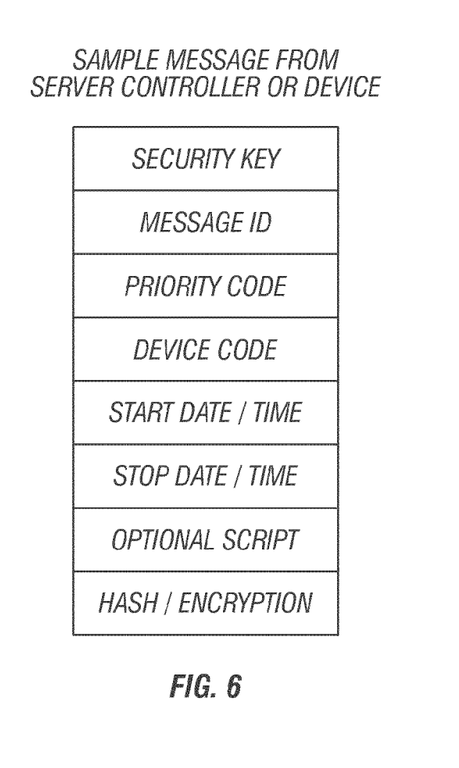
FIG. 6 is a diagram showing an example of a message sent from the master controller to a remote controller.

As illustrated, the control device may include one or more of the following modules:

Central Processing Unit (CPU): e.g. for general processing
    Memory: e.g. for data storage
    Network: e.g. for communicating to other devices
    Security: e.g. for checking the authenticity of an instruction from the power vendor
    Electric switch/regulator: e.g., for regulating the electricity
    Current Measurement System: e.g., for measuring the current
    Clock: e.g., for time measuring
    External Controllers FIG. 6 shows an example of a message sent from the master controller to a remote controller. As illustrated, the message may include at least one of the following information:

Security Key: e.g. for authenticity checking

Message ID:

Priority Code: e.g. for identifying the level of importance

Device Code: e.g. for identifying the device type

Start Date/Time: e.g., for the start time of a regulation action

Stop Date/Time: e.g., for the stop time of a regulation action

Optional Script: e.g., for carrying other information or remote instructions

Hash/Encryption: e.g., for security purposes

The system and method of regulating power consumption as described above may be used to remotely regulate the power consumption of each device. However, the system and method may be used for other purposes, and therefore should not be limited to remote regulation of the power consumption. For example, a power consumer may now a) monitor consumption by device, room, location; b) program hours of operation schedule (or stand-by); c) select vendor or buyer of commodity by device or location; and 4) remotely control a device manually or by another system (e.g. security system). The power vendor now may remotely control consumer devices in emergency, in utility shortage, or when there are discounted operating terms.

Figure 7A:
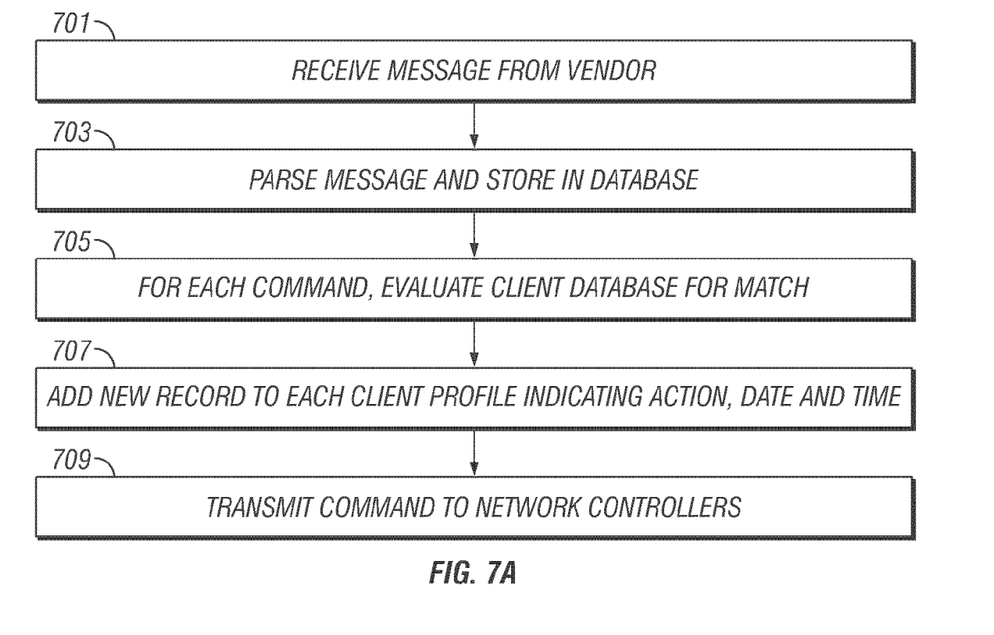
FIGS. 7A-7C are flowcharts illustrating the exemplary processes for scheduling and tracking the power consumption for each consumer.
Figure 7B:
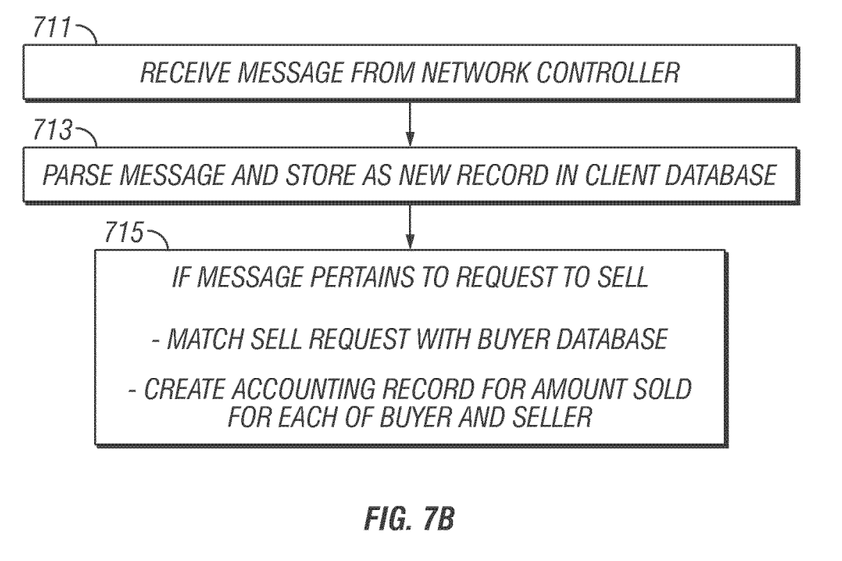
Figure 7C:
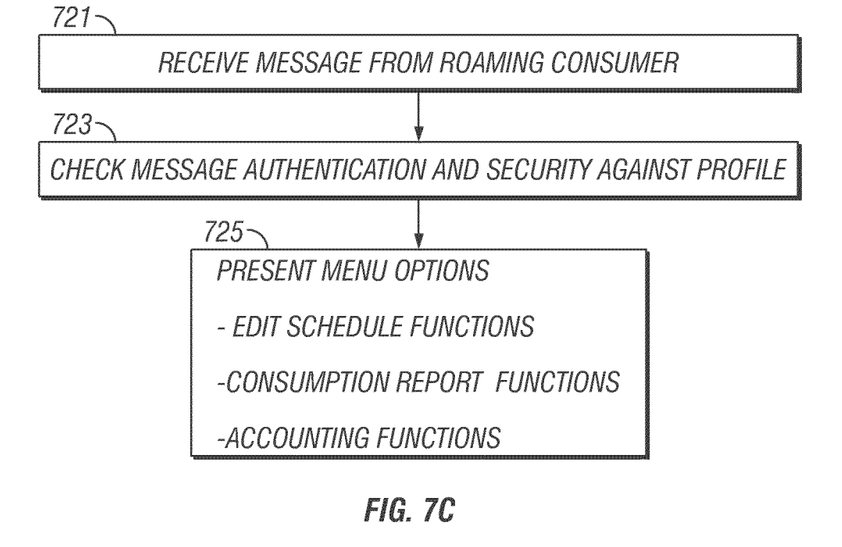

FIGS. 7A-7C illustrate the exemplary processes for scheduling and tracking the power consumption for each consumer. The exemplary method may be performed, for example, by the service bureau in FIG. 2. Depending on the embodiment, certain blocks of the method may be removed, merged together, or rearranged in order.

FIG. 7A illustrates a process for scheduling power consumption for a consumer. The method starts at a block 701, wherein a message is received from a power vendor. Next at a block 703, the message is parsed and stored in the database. Moving to a block 705, the client database is evaluated for a match to each command included in the message. Next at a block 707, new record is added to the client profile indicating the action, date, and the time for each command. Moving to a block 709, each command is transmitted to network controllers (such as the master controllers in FIG. 1). The command may include information regarding a schedule of the future power operation.

FIG. 7B illustrates a process for tracking power generation/supply by a consumer. The method starts at a block 711, where a message is received from a network controller (such as the remote controller). Next at a block 713, the message is parsed and stored as a new record in the client database. Moving to a block 715, it is determined whether the message relates to a request to sell electricity generated by the consumer. If it does, the sell request is matched with the buyer's and/consumer's database profile. An accounting record is created for the amount of power (e.g., number of kilowatt hours) sold for each buyer and seller.

FIG. 7C illustrates a process used by a consumer to track power consumption. The method starts at a block 721, where a message is received from a consumer. The consumer may be using a roaming device for communication. Next at a block 723, a security check is performed to authenticate the identity of the consumer against the profile in the database. Moving to a block 725, the consumer is presented with multiple menu options to manage/track the record. For example, the consumer may a) edit schedules for future operation, 2) retrieve a consumption report, and 3) perform other accounting functions.

Figure 8:
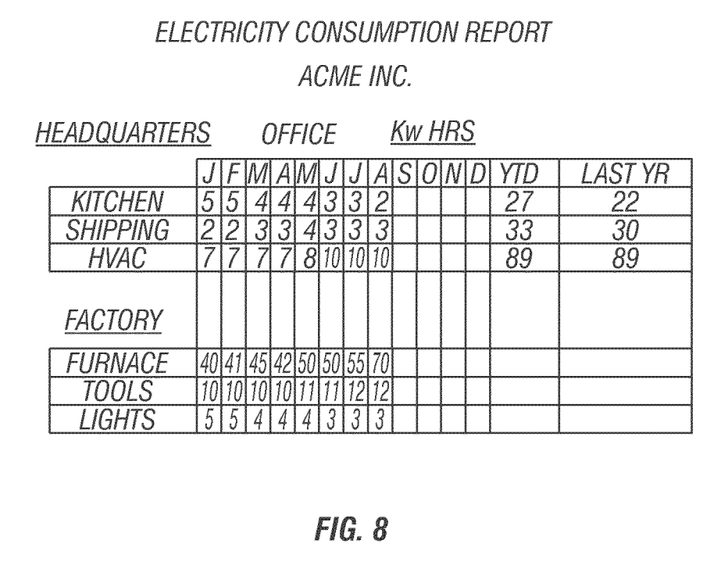
FIG. 8 is a diagram showing an exemplary power consumption report.

FIG. 8 shows an exemplary power consumption report. The report identifies the power usage for each branch of a business identity for last year, each month of this year, and for the year to date. For each branch, it further identifies the power usage for each department. Any data generated by the remote controllers may be stored by the master controller and presented to the user for the purposes of gaining insight into their power consumption patterns and for programming a power conservation schema. Applications on the master controller may be used to remotely program multiple sites with multiple appliances.

The foregoing embodiments are described as being used to regulate electricity consumption. It should be noted that these embodiments may be easily modified to regulate the consumption and supply of other utilities such as gas and water.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of remotely regulating the power supplied to a device, the method comprising:

receiving a message from a remote location at a controller having a digital memory and being locally connected to a plurality of devices;

retrieving, at the controller, a profile from a digital memory of each of the devices, wherein the profile includes a priority of the device;

storing in the controller memory the priority retrieved from each of the devices; and adjusting, at the controller, the power supplied to a particular device based on the message and the profile, wherein the local connections include a data communication connection and a power supply for each of the devices, wherein the message comprises a priority and a device type, and wherein the device profile further comprises a device type.

2. The method of claim 1, wherein the adjusting comprises adjusting the power supplied to the particular device based on the message when the priority of the particular device is within a priority range specified in the message.

3. The method of claim 1, wherein the adjusting comprises adjusting the power supplied to the particular device based on the message upon a power vendor having discounted operating terms.

4. The method of claim 1, wherein the receiving comprises receiving the message from the remote location over a wide area data network.

5. The method of claim 1, wherein the message comprises an instruction to adjust power supplied for a particular device to which the instruction has been communicated and having a priority falling in a priority range.

6. The method of claim 1, wherein the controller is locally in communication with a plurality of devices.

7. The method of claim 1, wherein the adjusting comprises switching on-or-off the power supplied to the particular device.

8. The method of claim 1, wherein the adjusting comprises adjusting the power supplied to the particular device via a graduated restriction of power.

9. The method of claim 1, wherein the particular device generates electricity, and further comprising:
sending, to the remote location, a message from the controller indicating the power generated for sale and a client associated with the device; and
adding, at the remote location, a record to a profile of the client indicating the time and the power generated.

10. The method of claim 1, further comprising:
sending, to the remote location, a supply of power schedule message comprising a command to schedule supply of power for a particular client;
adding, at the remote location, a record to a profile of the client indicating the time and the supply of power action; and
receiving, from the remote location, the command at the controller.

11. The method of claim 1, further comprising:
sending, to the remote location, a message from a client to track the power consumption of the client;
authenticating, at the remote location, the identity of the client; and
presenting, via a wide area data network, the client with menu options to track the power consumption.

12. The method of claim 11, wherein the menu options comprise one or more of the following: edit a schedule for power consumption and generate a power consumption report.

13. The method of claim 1, wherein a profile of a client is used in selecting a vendor of the power supplied to the particular device or a buyer of power generated by the particular device.

14. The method of claim 1, wherein the message comprises an instruction to adjust power supplied for a particular device to which the instruction has been communicated, having a priority falling in a priority range and having a first device type, wherein the profile further comprises the device type of the device, and wherein the adjusting comprises adjusting the power supplied to the device based on the message if the priority of the device is within the priority range specified in the message and the device type of the device is the same as the first device type.

15. The method of claim 1, wherein the controller is associated with an electric valve/switch to adjust the power supplied to the particular device.

16. The method of claim 1, wherein the priority in the message comprises a priority range.

17. The method of claim 1, wherein the message comprises a start time and a stop time for a regulation action.

18. The method of claim 1, wherein the device profile further comprises a unique identifier.

19. A system for remotely regulating the power supplied to a device, the system comprising:
a first controller locally connected to a plurality of devices and that adjusts the power supplied to at least one of the plurality of devices based on a message received from a second controller, the second controller being remote from the plurality of devices,
wherein the first controller retrieves a profile from a digital memory of each of the devices, and adjusts the power supplied to the at least one of the plurality of devices based on the message and the profile, wherein the profile includes a priority of a particular device, and wherein the first controller comprises a digital memory configured to store the priority of each of the devices, and
wherein the local connections include a data communication connection and a power supply for each of the devices,
wherein the message comprises a priority and a device type, and
wherein the device profile further comprises a device type.

20. The system of claim 19, wherein the first controller adjusts the power supplied to the at least one of the plurality of devices based on the message when the priority of the device is within a priority range specified in the message.

21. The system of claim 19, further comprising a communication module locally attached to the first controller, wherein the first controller communicates with the second controller via the communication module over a wide area data network.

22. The system of claim 19, wherein the message comprises an instruction to adjust power supplied for a device to which the instruction has been communicated and having a priority falling in a priority range.

23. The system of claim 19, wherein the first controller is associated with an electric valve/switch to adjust the power supplied to the at least one of the plurality of devices.

24. The system of claim 19, wherein the at least one of the plurality of devices generates electricity, and wherein the second controller:
receives a message from the first controller indicating the power generated for sale and a client associated with the device; and
adds a record to a profile of the client indicating the time and the power generated.

25. The system of claim 19, wherein the second controller:
receives a supply of power schedule message comprising a command to schedule supply of power for a particular client;
adds a record to a profile of the client indicating the time and the supply of power action; and
transmits the command to the first controller.

26. The system of claim 19, wherein the second controller:
receives a message from a client to track the power consumption of the client; and
presents, via a wide area data network, the client with menu options to track the power consumption.

27. The system of claim 19, wherein the message comprises a first device type, a priority range, and an instruction to adjust power supplied for a device to which the instruction has been communicated, wherein the profile further comprises the device type of the device, and wherein the first controller adjusts the power supplied to the device based on the message if the priority of the device is within the priority range specified in the message and the device type of the device is the same as the first device type.

28. A system for remotely regulating the power supplied to a device, the system comprising:
means for receiving a message from a remote location at a controller having a digital memory and being locally connected to a plurality of devices;
means for retrieving, at the controller, a profile from a digital memory of each of the devices, wherein the profile includes a priority of the device;
means for storing in the controller memory the priority retrieved from each of the devices; and means for adjusting, at the controller, the power supplied to a particular device based on the message and the profile,
wherein the local connections include a data communication connection and a power supply for each of the devices,
wherein the message comprises a priority and a device type, and
wherein the device profile further comprises a device type.

29. A method of remotely regulating a utility supplied to a device, the method comprising:
receiving a message from a remote location at a controller having a digital memory and being locally connected to a plurality of devices;
retrieving, at the controller, a priority of the device and a device type from a digital memory of each of the devices;
storing in the controller memory the priority retrieved from each of the devices; and
adjusting, at the controller, the utility supplied to a particular device based on the message and the priority,
wherein the local connections include a data communication connection and a utility supply connection for each of the devices,
wherein the message comprises a priority and a device type.

30. The method of claim 29, wherein the utility is water.

31. The method of claim 29, wherein the utility is gas.

32. The method of claim 29, wherein the controller is associated with an electro-mechanical valve to adjust the utility supplied to the particular device.

33. The method of claim 29, wherein the utility is distributed from a utility vendor to a plurality of controllers.

* * * * *